April 19, 1932.  A. L. V. C. DEBRIE  1,855,128
FOCUSING DEVICE FOR CINEMATOGRAPHIC VIEW TAKING APPARATUS
Filed May 18, 1926  2 Sheets-Sheet 1
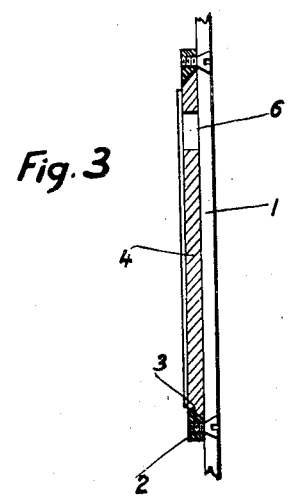
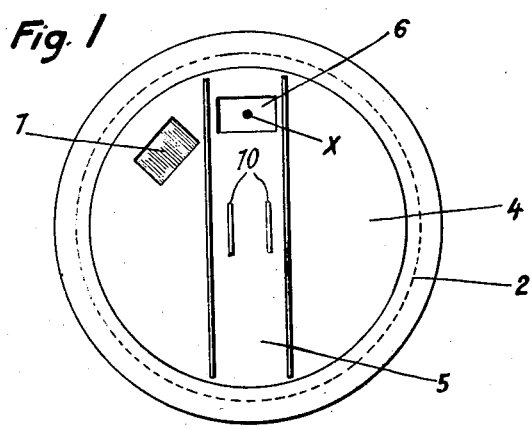
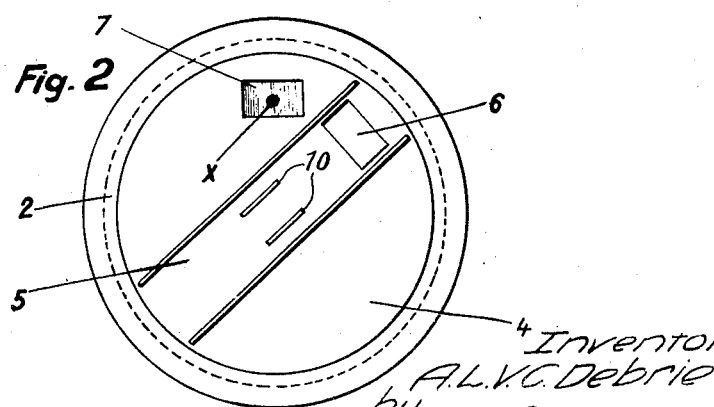

Patented Apr. 19, 1932

1,855,128

UNITED STATES PATENT OFFICE

ANDRÉ LÉON VICTOR CLÉMENT DEBRIE, OF PARIS, FRANCE

FOCUSING DEVICE FOR CINEMATOGRAPHIC VIEW TAKING APPARATUS

Application filed May 18, 1926, Serial No. 109,937, and in France April 14, 1926.

It is known that whilst cinematographic views are being taken it is necessary to refocus several times. For this operation to be effected under the best conditions possible, it is necessary that the device which provides for this focusing should answer certain requirements such as for instance that of the objective lens remaining stationary with reference to the view taking apparatus so as to avoid the need of finding which is always long and delicate.

A number of devices have been already proposed for focusing but they have generally not proved quite satisfactory either because they are, seen from a mechanical standpoint, comparatively intricate arrangements or else because they answer imperfectly the above mentioned requirements.

My present invention has for its object a device which shows none of these drawbacks and wherein the film is guided as is usual in a grooved channel in front of the view taking aperture and is caused when the focusing is to be effected to be drawn aside with the guiding channel by means of a pivoting motion. It is then replaced in front of the view taking aperture by a frame bearing a frosted surface such as glass. At the same time the shutter is moved laterally through any known means away from the objective lens so as to leave the focusing field free; thus the focusing can be made directly without any other optical arrangement being interposed beyond the view taking object glass.

This device can be executed by providing for the movement of the film alone with its guiding channel in which case the driving clutches are kept in their release position with reference to the film when the latter is moved aside from the view taking aperture. The device can also be executed by providing for the removal of the film with part of its driving device (i. e. the driving clutches) or again with the whole of its driving device.

Fig. 1 is an end view of the device in the position used for view taking.

Fig. 2 is a similar view thereof in the position used for focusing.

Fig. 3 is a side view.

Figure 5:
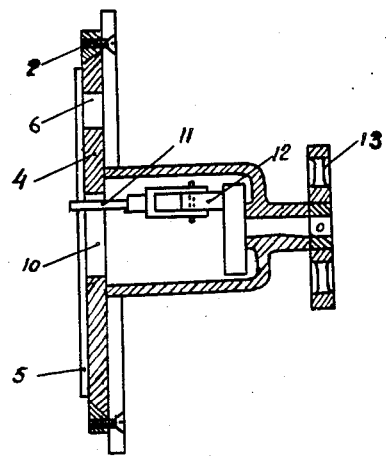
Fig. 5 is a similar view of a modification wherein the reciprocating control mechanism of the claws rotates together with the claws, the film-guide and the plate.

The view taking apparatus is of any known type and need not be described or illustrated. To the inside of the plate 1 provided with the view taking aperture 1' is inserted an annular ring 2 the inside of which is bevelled. Inside this ring and kept down by this bevel is disposed a circular plate 4 adapted to rotate round its axis. This plate shows on its inner side the guiding channel 5 wherein the film is caused to move when it comes near the view taking aperture.

In the plate 4 is provided a rectangular opening 6 passing through the channel 5 and adapted to come when the plate 4 is in the position allowing the views to be taken (Fig. 1) in front of the view taking aperture. Another opening 7 having the same size as the opening 6 closed with a frosted surface such as a rough glass is provided in the plate 4 at a certain angular distance from the said opening 6 and at the same distance from the center as the latter. The film feed slots are shown at 10.

When it is desired to focus, it is sufficient under these conditions to rotate the plate 4 which is originally in the position shown on Fig. 1 and to bring it into that shown on Fig. 2. The film drawn along with the guiding channel 5 passes away from the view taking aperture and is replaced by the frame 7 provided with the rough glass. Thus the focusing can be effected directly without any prisms or other optical devices being interposed beyond the view taking object glass.

The optical axis of the apparatus passes through the plane of the surface of the plate 4 at the point marked X on Figs. 1 and 2.

Figure 4:
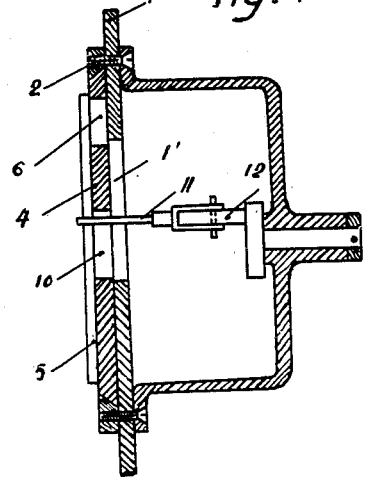
Fig. 4 shows a first form of execution of the device seen from above with the film advancing claws retracted to allow rotation of the plate carrying the film guiding channel.

In the form of execution shown in Fig. 4 the rotation of the film carrying plate is possible as soon as the claws 11 are retracted far enough, mere application of the hand on the plate provides its rotation with the film, the usual loops of which are pliant enough to allow such a displacement with reference to the remainder of the film. In Fig. 5 the claws and their reciprocating control mechanism 12 rotate integrally with the plate. This mechanism is shown as controlled through the pulley 13.

It should be well understood that the above described form of execution has been given by way of example and could be replaced by any other suitable equivalent arrangement. Thus for instance the plate 4 instead of rotating inside an annular ring might pivot round a suitably chosen axis in which case it would not be necessary for this plate to have a circular outline.

What I claim is:

1. In a cinematographic view taking apparatus the combination of a front plate provided with a view taking aperture a film guiding part, means disposed in front of said part and bearing same, adapted to pivot round an axis parallel to the optic axis of the apparatus and provided with an aperture adapted to register with the view taking aperture, said aperture being provided in the axis of the film guiding part and a ground glass mounted on the pivoting means at the same radial distance from the pivoting axis as the view taking aperture.

2. In a cinematographic view taking apparatus the combination of a front plate provided with a view taking aperture a film guiding part, a rotatable plate in front of said part and bearing same and provided with two apertures adapted to register with the view taking aperture, said apertures being respectively provided in the axis of the film guiding part and outside said part, and a ground glass closing the second of the said apertures.

3. In a cinematographic view taking apparatus, the combination of a front plate provided with a view taking aperture a film guiding part, a circular bevelled rotatable plate in front of said part and bearing same and provided with two apertures adapted to register with the view taking aperture, said apertures being respectively provided in the axis of the film guiding part and outside said part, a ground glass closing the second of the said apertures and a bevelled ring secured to the front plate inside which the plate is rotatably mounted.

4. In a device as claimed in claim 1, the provision of reciprocating claws for intermittently advancing the film through its guiding part, and means for retracting the claws to allow the free pivoting motion of the pivoting means in front of said claws.

5. In a device as claimed in claim 1, the provision of reciprocating claws for intermittently advancing the film through its guiding part and means whereby said claws pivot integrally with the pivoting means.

6. In a device as claimed in claim 1, the provision of reciprocating claws for intermittently advancing the film through its guiding part and a film driving device, said driving device and reciprocating claws pivoting integrally with the pivoting means.

In testimony whereof I have signed my name to this specification.

ANDRÉ LÉON VICTOR CLÉMENT DEBRIE.